United States Patent
Smoggie et al.

(10) Patent No.: US 6,472,353 B1
(45) Date of Patent: Oct. 29, 2002

(54) DISPERSANT-VISCOSITY IMPROVERS FOR LUBRICATING OIL COMPOSITIONS

(75) Inventors: John C. Smoggie, Concord, OH (US); Richard M. Lange, Euclid, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/856,040

(22) PCT Filed: Sep. 14, 2000

(86) PCT No.: PCT/US00/25173

§ 371 (c)(1),
(2), (4) Date: May 16, 2001

(87) PCT Pub. No.: WO01/19882

PCT Pub. Date: Mar. 22, 2001

(51) Int. Cl.[7] .................. C10M 149/10; C08F 255/06
(52) U.S. Cl. .................. 508/221; 508/543; 525/279; 525/281; 525/282; 525/296
(58) Field of Search ................ 508/221, 543; 525/279, 281, 282, 296

(56) References Cited

U.S. PATENT DOCUMENTS

| | | | |
|---|---|---|---|
| 4,085,055 A | 4/1978 | Durand et al. | |
| 4,092,255 A | 5/1978 | Chapelet et al. | 252/50 |
| 4,146,489 A | 3/1979 | Galluccio et al. | |
| 4,282,132 A | * 8/1981 | Benda et al. | 525/279 |
| 4,338,418 A | 7/1982 | Jost et al. | |
| 4,358,565 A | 11/1982 | Eckert | 525/280 |
| 4,447,582 A | 5/1984 | Gros | 525/279 |
| 4,519,929 A | 5/1985 | O'Brien et al. | 252/51.5 A |
| 4,578,429 A | 3/1986 | Gergen et al. | 525/291 |
| 4,922,045 A | 5/1990 | White et al. | 585/10 |
| 4,933,234 A | * 6/1990 | Kobe et al. | 428/336 |
| 5,035,820 A | 7/1991 | Rhodes et al. | 252/50 |
| 5,141,996 A | 8/1992 | Zon et al. | 525/279 |
| 5,298,565 A | 3/1994 | Lange et al. | |
| 5,523,008 A | 6/1996 | Boden et al. | |
| 5,534,174 A | 7/1996 | Harstick et al. | |
| 5,663,126 A | 9/1997 | Boden et al. | 508/221 |

FOREIGN PATENT DOCUMENTS

| | | |
|---|---|---|
| EP | 0082574 A | 6/1983 |
| JP | 47029481 | * 2/1972 |
| JP | 47-29481 | 11/1972 |
| JP | 47029481 | 11/1972 |
| WO | WO98/13443 | 4/1998 |

OTHER PUBLICATIONS

* Chem ABS Data, EPO–Internal, WPI Data, PAJ, INSPEC, Konotsune et al., "Polyolefines having good dyeability", Database Accession No. 79:92869 CA XP002155161, Chisso Corp., Nov. 6, 1972.

* cited by examiner

Primary Examiner—Jacqueline V. Howard
(74) Attorney, Agent, or Firm—David M. Shold; Michael F. Esposito

(57) ABSTRACT

Graft copolymers useful as a dispersant-viscosity improver for lubricating oil compositions comprise a hydrocarbon polymer having graft polymerized thereon at least two nitrogen containing units, at least one of the nitrogen containing units being derived from at least one of a neutral N-(lower hydrocarbyl group)- (meth)acrylamide and a neutral N,N-di-(lower hydrocarbyl group)- (meth)acrylamide, wherein the total number of carbon atoms in the lower hydrocarbyl groups does not exceed 9, and at least one of the nitrogen containing units being derived from at least one vinylic nitrogen containing heterocyclic compound.

27 Claims, No Drawings

DISPERSANT-VISCOSITY IMPROVERS FOR LUBRICATING OIL COMPOSITIONS

This application is a 371 of PCT/6500/25173 Sep. 14, 2000.

FIELD OF THE INVENTION

This invention relates to dispersant-viscosity improvers for lubricating oils, and oil compositions and concentrates containing such dispersant-viscosity improvers.

BACKGROUND OF THE INVENTION

The viscosity of lubricating oils, particularly the viscosity of mineral oil based lubricating oils, is generally dependent upon temperature. As the temperature of the oil is increased, the viscosity decreases at an undesirable rate.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Viscosity improvers are usually polymeric materials and are often referred to as viscosity index improvers or as viscosity modifiers.

Dispersants are also well-known in the lubricating art. Dispersants are employed in lubricants to keep impurities, particularly those formed during operation of mechanical devices such as internal combustion engines, automatic transmissions, etc. in suspension rather than allowing them to deposit as sludge or other deposits on the surfaces of lubricated parts.

Multifunctional additives that provide both viscosity improving properties and dispersant properties are likewise known in the art. Such products are described in numerous publications including Dieter Klamann, "Lubricants and Related Products", Verlag Chemie Gmbh (1984), pp 185–193; C. V. Smalheer and R. K. Smith "Lubricant Additives", Lezius-Hiles Co. (1967); M. W. Ranney, "Lubricant Additives", Noyes Data Corp. (1973), pp 92–145, M. W. Ranney, "Lubricant Additives, Recent Developments", Noyes Data Corp. (1978), pp 139–164; and M. W. Ranney, "Synthetic Oils and Additives for Lubricants", Noyes Data Corp. (1980), pp 96–166. Each of these publications is hereby expressly incorporated herein by reference.

Dispersant-viscosity improvers are generally prepared by functionalizing, i.e., adding polar groups to, a hydrocarbon polymer backbone.

Hayashi, et al, U.S. Pat. No. 4,670,173 relates to compositions suitable for use as dispersant-viscosity improvers made by reacting an acylating reaction product which is formed by reacting a hydrogenated block copolymer and an alpha-beta olefinically unsaturated reagent in the presence of free-radical initiators, then reacting the acylating product with a primary amine and optionally with a polyamine and a mono-functional acid.

Chung et al, U.S. Pat. No. 5,035,821 relates to viscosity index improver-dispersants comprised of the reaction products of an ethylene copolymer grafted with ethylenically unsaturated carboxylic acid moieties, a polyamine having two or more primary amino groups or polyol and a high functionality long chain hydrocarbyl substituted dicarboxylic acid or anhydride.

Van Zon et al, U.S. Pat. No. 5,049,294, relates to dispersant/VI improvers produced by reacting an a alpha-beta unsaturated carboxylic acid with a selectively hydrogenated star-shaped polymer then reacting the product so formed with a long chain alkane-substituted carboxylic acid and with a $C_1$ to $C_{18}$ amine containing 1 to 8 nitrogen atoms and/or with an alkane polyol having at least two hydroxy groups or with the preformed product thereof.

Bloch et al, U.S. Pat. No. 4,517,104, relates to oil soluble viscosity improving ethylene copolymers reacted or grafted with ethylenically unsaturated carboxylic acid moieties then with polyamines having two or more primary amine groups and a carboxylic acid component or the preformed reaction product thereof.

Gutierrez et al, U.S. Pat. No. 4,632,769, describes oil-soluble viscosity improving ethylene copolymers reacted or grafted with ethylenically unsaturated carboxylic acid moieties and reacted with polyamines having two or more primary amine groups and a $C_{22}$ to $C_{28}$ olefin carboxylic acid component.

Steckel, U.S. Pat. No. 5,160,648 describes dispersant materials prepared by reacting highly condensed polyamines with carboxylic reactants and phenolic reactants.

Stambaugh et al, U.S. Pat. No. 4,146,489 relates to graft copolymers wherein the backbone polymer is a rubbery, oil soluble ethylene-propylene copolymer or ethylene-propylene diene modified terpolymer and the graft monomer is a C-vinyl pyridine or N-vinylpyrrolidone. They are described as providing dispersant properties to hydrocarbon fuels and combined viscosity index improvement and dispersant properties to lubricating oils for internal combustion engines. The graft copolymers are prepared by intimate admixture of backbone polymer, graft monomer and free radical initiator at a temperature below initiation temperature, followed by a temperature increase to or above initiation temperature.

Jost et al, U.S. Pat. No. 4,338,418 discloses a method of making a lubricating-oil additive which improves the viscosity index and has a dispersing and detergent action, which method comprises graft copolymerizing, onto an oil-soluble base polymer, from 0.5 to 10 parts of a polymerizable lactam together with 0.1 to 3 parts of a polymerizable N-heterocyclic compound, said parts being by weight of said base polymer, and the lubricating oil additives so produced.

Each of these patents is hereby expressly incorporated herein by reference.

For additional disclosures concerning multi-purpose additives and particularly viscosity improvers and dispersants, the disclosures of the following United States patents are incorporated herein by reference:

| | | |
|---|---|---|
| 2,973,344 | 3,488,049 | 3,799,877 |
| 3,278,550 | 3,513,095 | 3,842,010 |
| 3,311,558 | 3,563,960 | 3,864,098 |
| 3,312,619 | 3,598,738 | 3,864,268 |
| 3,326,804 | 3,615,288 | 3,879,304 |
| 3,403,011 | 3,637,610 | 4,033,889 |
| 3,404,091 | 3,652,239 | 4,051,048 |
| 3,445,389 | 3,687,849 | 4,234,435 |

As noted above, dispersant viscosity improvers have been prepared via free radical grafting of vinyl nitrogen monomers onto a wide variety of hydrocarbon polymer backbones. Some vinyl nitrogen monomers such as N-vinyl pyrrolidone and dimethylaminoalkyl methacrylamides are usually easily grafted under free radical conditions. Other vinyl nitrogen monomers such as N-vinyl imidazole tend to resist grafting under free radical conditions.

It has now been found that simultaneous grafting of certain specific and well-defined combinations of two or more different nitrogenous vinyl monomers leads to more efficient grafting, especially of monomers that are difficult to graft employing more conventional techniques. Moreover, the graft copolymers obtained thereby demonstrate surprisingly outstanding dispersancy and sludge suspension properties.

It is a primary object of this invention to provide novel multi-purpose lubricant additives.

A more specific object is to provide multi-purpose additives directed to improving lubricant viscosities and dispersancy properties.

A further object is to provide processes for preparing such multi-purpose additives.

Another object is to facilitate grafting, under free radical conditions, of vinylic nitrogen containing monomers onto a hydrocarbon backbone.

Still another object is to provide lubricants having improved dispersancy and viscosity properties.

Other objects will in part be obvious in view of this disclosure and will in part appear hereinafter.

SUMMARY OF THE INVENTION

The present invention is directed to a graft copolymer useful as a dispersant-viscosity improver for lubricating oil compositions. The graft copolymer comprises a hydrocarbon polymer having graft polymerized thereon at least two nitrogen containing units, at least one of the nitrogen containing units being derived from at least one of a neutral N-(lower hydrocarbyl group)- (meth)acrylamide and a neutral N,N-di-(lower hydrocarbyl group)- (meth)acrylamide, wherein the total number of carbon atoms in the lower hydrocarbyl groups does not exceed 9, and at least one of the nitrogen containing units being derived from at least one vinylic nitrogen containing heterocyclic compound.

This invention is also directed to a process for preparing the graft copolymer, methods for improving the efficiency of free radical grafting of vinylic nitrogen containing heterocyclic monomers onto hydrocarbon polymers, additive concentrates and lubricating oil compositions comprising the copolymers of the invention, and methods for improving the viscometrics and dispersancy characteristics of lubricating oil compositions.

DETAILED DESCRIPTION OF THE PREFERRED EMBODIMENTS

According to the present invention, a composition of matter suitable for use as a dispersant-viscosity improver for lubricating oil compositions is a graft copolymer comprising a hydrocarbon polymer having graft polymerized thereon at least two different nitrogen containing units, at least one of the nitrogen containing units being derived from at least one of a neutral N-(lower hydrocarbyl group)- (meth)acrylamide and a neutral N,N-di-(lower hydrocarbyl group)- (meth) acrylamide, wherein the total number of carbon atoms in the lower hydrocarbyl groups does not exceed 9, and at least one of the nitrogen containing units being derived from at least one vinylic nitrogen containing heterocyclic compound.

As used herein, graft copolymers are defined as copolymers having a polymeric hydrocarbon backbone chain to which groups of a different chemical composition are attached at one or more positions along the backbone. The attached groups may be monomeric or polymeric, often oligomeric. The graft copolymers of this invention have unique properties resulting from the combination of the grafted units together with the backbone polymer. The use of the mixture of graft monomers also facilitates the grafting process.

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated, in a lubricating oil composition. For a further discussion of the terms oil soluble and dispersible, particularly "stably dispersible", see U.S. Pat. No. 4,320,019 which is expressly incorporated herein by reference for relevant teachings in this regard.

The Hydrocarbon Polymer

As used herein, the expression 'polymer' refers to polymers of all types, i.e., homopolymers and copolymers. The term homopolymer refers to polymers derived from essentially one monomeric species; copolymers are defined herein as being derived from 2 or more monomeric species.

The hydrocarbon polymer is an essentially hydrocarbon based polymer, usually one having a number average molecular weight ($\overline{M}_n$) ranging from about 6,000, often from about 20,000 and up to about 500,000, often up to about 300,000 more often up to about 200,000. Molecular weights of the polymeric hydrocarbon polymer are determined using well known methods described in the literature. Examples of procedures for determining the molecular weights are gel permeation chromatography (GPC) (also known as size-exclusion chromatography) and vapor phase osmometry (VPO). These and other procedures are described in numerous publications including:

P. J. Flory, "Principles of Polymer Chemistry", Cornell University Press (1953), Chapter VII, pp 266–316, and "Macromolecules, an Introduction to Polymer Science", F. A. Bovey and F. H. Winslow, Editors, Academic Press (1979), pp 296–312.

W. W. Yau, J. J. Kirkland and D. D. Bly, "Modem Size Exclusion Liquid Chromatography", John Wiley and Sons, New York, 1979.

These publications are hereby incorporated by reference for relevant disclosures contained therein relating to the determination of molecular weight.

A measurement which is complementary to, and often descriptive of, a polymer's molecular weight is the melt index (ASTM D-1238)which is a measure of the relative flow or fluidity of a polymer under defined conditions of pressure and temperature. Polymers of low melt index generally have a high molecular weight and/or a high degree of linearity, and vice versa. The grafted polymers of the present invention preferably have a melt index of up to 20 dg/min, more preferably 0.1 to 10 dg/min.

When the molecular weight of a polymer is greater than desired, it may be reduced by techniques known in the art. Such techniques include mechanical shearing of the polymer employing masticators, ball mills, roll mills, extruders and the like. Oxidative or thermal shearing or degrading techniques are also useful and are known. Details of numerous procedures for shearing polymers are given in U.S. Pat. No. 5,348,673 which is hereby incorporated herein by reference for relevant disclosures in this regard.

The graft copolymers are typically derived from hydrocarbon polymers. Because the graft copolymers are prepared by a free radical process, the grafting process is adaptable to a wide variety of polymer substrates. The only limitation on the nature of the hydrocarbon polymer is that it contain a hydrogen atom that is accessible and abstractable in the presence of the free radical initiator. Appropriate hydrocarbon polymers include those which contain a measure of olefinic unsaturation, as well as those which are substantially saturated. Included are hydrocarbon polymers that contain terminal or penultimate carbon-carbon unsaturation residues due to termination processes and those having backbone or pendant unsaturation due to the incorporation of diene monomers, as well as polymers wherein such unsaturation has been intentionally reduced or removed by chemical means, such as catalytic hydrogenation. Preferably, the hydrocarbon polymer will typically contain olefinic unsaturation, based on the total number of carbon to carbon bonds in the polymer, of less than 5%. More preferably, the polymer will contain less than 2%, and usually no more than 1% residual unsaturation. Most preferably, the hydrocarbon polymer is substantially free of olefinic unsaturation.

Many hydrocarbon polymers, when manufactured, contain significant amounts of olefinic unsaturation. In order to reduce this unsaturation, they may be hydrogenated to reduce the amount of olefinic unsaturation to acceptable levels. Usually they are hydrogenated to such an extent that the resulting hydrogenated polymer has olefinic unsaturation, based on the total number of carbon to carbon bonds in the polymer, of less than 5%, preferably less than 2%, more preferably no more than 1% residual unsaturation. Most preferably, the hydrocarbon polymer is exhaustively hydrogenated. The polymer may contain aliphatic, aromatic or cycloaliphatic components, or mixtures thereof. Aromatic unsaturation is not considered olefinic unsaturation within the context of this invention. Depending on hydrogenation conditions, up to about 50% of aromatic groups may be hydrogenated.

In preferred embodiments, the hydrocarbon polymer is an oil soluble or dispersible homopolymer or copolymer selected from the group consisting of:

(1) polymers and hydrogenated polymers of dienes;
(2) copolymers and hydrogenated copolymers of conjugated dienes with vinyl substituted aromatic compounds; moreover
(3) polymers of alpha-olefins having from 2 to about 28 carbon atoms;
(4) olefin-diene copolymers and hydrogenated analogs thereof; and
(5) star polymers.

These preferred polymers are described in greater detail hereinbelow.

(1) Polymers of Dienes

The hydrocarbon polymer may be a homopolymer or copolymer of one or more dienes or a hydrogenated homopolymer or copolymer of one or more dienes. The diene polymers in this application are preferably those which have been substantially hydrogenated, and contain little residual unsaturation.

The dienes may be conjugated such as isoprene, butadiene and piperylene, or non-conjugated, such as 1–4 hexadiene and dicyclopentadiene. Polymers of conjugated dienes are preferred. Such polymers are conveniently prepared via free radical and anionic polymerization techniques. Emulsion techniques are commonly employed for free radical polymerization.

Hydrogenation is usually accomplished employing catalytic methods. Catalytic techniques employing hydrogen under high pressure and at elevated temperature are well-known to those skilled in the chemical art.

An extensive discussion of hydrogenated diene polymers appears in the "Encyclopedia of Polymer Science and Engineering", Volume 2, pp 550–586, and Volume 8, pp 499–532, Wiley-Interscience (1986), which is hereby expressly incorporated herein by reference for relevant disclosures in this regard.

Hydrogenated polymers include homopolymers and copolymers of conjugated dienes including polymers of 1,3-dienes of the formula

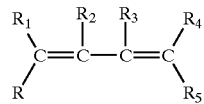

wherein each substituent denoted by R, or R with a numerical subscript, is independently hydrogen or hydrocarbon based, wherein hydrocarbon based is as defined hereinabove. At least one substituent is H. Preferably, when $R_3$ is hydrocarbyl, R and $R_1$ will both be hydrogen, and when $R_2$ is hydrocarbyl, then R4 and $R_5$ will both be hydrogen. Most preferably, $R_1$, $R_2$, $R_3$ and $R_4$ will all be hydrogen. Normally, the total carbon content of the diene monomer will not exceed 20 carbons. Preferred dienes for preparation of the polymer are piperylene, isoprene, 2,3-dimethyl-1,3-butadiene, chloroprene and 1,3-butadiene.

Suitable homopolymers of conjugated dienes are described, and methods for their preparation are given in numerous U.S. patents, including the following:

U.S. Pat. No. 3,547,821
U.S. Pat. No. 3,835,053
U.S. Pat. No. 3,959,161
U.S. Pat. No. 3,965,019
U.S. Pat. No. 4,085,055
U.S. Pat. No. 4,116,917

As a specific example, U.S. Pat. No. 3,959,161 teaches the preparation of hydrogenated polybutadiene. In another example, upon hydrogenation, 1,4-polyisoprene becomes an alternating copolymer of ethylene and propylene.

Copolymers of conjugated dienes are prepared from two or more conjugated dienes. Useful dienes are the same as those described in the preparation of homopolymers of conjugated dienes hereinabove. The following U.S. Patents describe diene copolymers and methods for preparing them:

U.S. Pat. No. 3,965,019
U.S. Pat. No. 4,073,737
U.S. Pat. No. 4,085,055
U.S. Pat. No. 4,116,917

For example, U.S. Pat. No. 4,073,737 describes the preparation and hydrogenation of butadiene-isoprene copolymers.

(2) Copolymers of Conjugated Dienes with Vinyl Substituted Aromatic Compounds

In one embodiment, the hydrocarbon polymer is a copolymer of a vinyl-substituted aromatic compound and a conjugated diene. In another embodiment, it is a hydrogenated copolymer of a vinyl-substituted aromatic compound and a conjugated diene.

As used herein, the term copolymer refers to polymers derived from 2 or more monomeric species. In this embodiment, one is a vinyl substituted aromatic compound and the other is an aliphatic conjugated diene.

The vinyl substituted aromatics generally contain from 8 to about 20 carbons, preferably from 8 to 12 carbon atoms and most preferably, 8 or 9 carbon atoms.

Examples of vinyl substituted aromatics include vinyl anthracenes, vinyl naphthalenes and vinyl benzenes (styrenic compounds). Styrenic compounds are preferred, examples being styrene, alpha-methystyrene, ortho-methyl styrene, meta-methyl styrene, para-methyl styrene, tertiary-butylstyrenes, chlorostyrenes, and chloromethyl styrenes, with styrene being preferred.

The conjugated dienes generally have from 4 to about 10 carbon atoms and preferably from 4 to 6 carbon atoms. Example of conjugated dienes include piperylene, 2,3-dimethyl-1,3-butadiene, chloroprene, isoprene and 1,3-butadiene, with isoprene and 1,3-butadiene being particularly preferred. Mixtures of such conjugated dienes are useful.

The vinyl substituted aromatic content of these copolymers is typically in the range of about 20% to about 70% by weight, preferably about 40% to about 60% by weight. The aliphatic conjugated diene content of these copolymers is typically in the range of about 30% to about 80% by weight, preferably about 40% to about 60% by weight.

The polymers, and in particular, styrene-diene copolymers, can be random copolymers, regular block copolymers or random block copolymers. Random copolymers are those in which the comonomers are randomly, or nearly randomly, arranged in the polymer chain with no significant blocks (segments) of homopolymer of either monomer. Regular block copolymers are those in which a small number, usually one or two, of relatively long chains of homopolymer of one type of monomer are alternately joined to a small number, usually one or two, of relatively long chains of homopolymer of another type of monomer. Random block copolymers are those in which a larger number of relatively short segments of homopolymer of one type of monomer alternate with relatively short segments of homopolymer of another monomer.

Other polymerization techniques such as emulsion polymerization can be used.

The random, regular block and random block polymers used in this invention may be linear, or they may be partially or highly branched. The relative arrangement of homopolymer segments in a linear regular block or random block polymer is obvious. Differences in structure lie in the number and relative sizes of the homopolymer segments; the arrangement in a linear block polymer of either type is always alternating in homopolymer segments.

Normal or regular block copolymers usually have from 1 to about 5, often 1 to about 3, preferably only from 1 to about 2 relatively large homopolymer blocks of each monomer. Thus, a linear regular diblock copolymer of styrene or other vinyl aromatic monomer (A) and diene (B) would have a general structure represented by a large block of homopolymer (A) attached to a large block of homopolymer (B), as:

$$(A)_a(B)_b$$

where a and b are as described hereinbelow. Techniques vary for the preparation of these "A-B-A" and "B-A-B" triblock polymers, and are described in the literature for anionic polymerization.

Similarly, a regular linear tri-block copolymer of styrene or other vinyl aromatic monomer (A) and diene monomer (B) may be represented, for example, by $$(A)_a(B)_b(A)_c, \text{ or } (B)_a(A)_b(B)_c, \text{ or } (A)_a(B)_b(C)_c$$

where (C) represents a segment of a third monomer. Several configurations are possible depending on how the homopolymer segments are arranged with respect to each other. For example, linear triblock copolymers of monomers (A), (B) and (C) can be represented by the general configurations:

$$(A)_a\text{-}(B)_b\text{-}(C)_c, (A)_a\text{-}(C)_c\text{-}(B)_b, \text{ or } (B_b\text{-}(A)_a\text{-}(C)_c,$$

wherein the lower case letters a, b and c represent the approximate number of monomer units in the indicated block.

The sizes of the blocks are not necessarily the same, but may vary considerably. The only stipulation is that any regular block copolymer comprises relatively few, but relatively large, alternating homopolymer segments.

As an example, when (A) represents blocks derived from diene such as isoprene or butadiene, "a" usually ranges from about 100 to about 2000, preferably from about 500 to about 1500; when (B) represents, for example, blocks derived from styrene, "b" usually ranges from about 100 to about 2000, preferably from about 200 to about 1000; and when a third block (C) is present, "c" usually ranges from about 10 to about 1000, provided that the $\overline{M}_n$ of the polymer is within the ranges indicated as useful for this invention.

The copolymers can be prepared by methods well known in the art. Such copolymers usually are prepared by anionic polymerization using Group Ia metals in the presence of electron-acceptor aromatics, or preformed organometallics such as sec-butyllithium as polymerization catalysts.

The styrene/diene block polymers are usually made by anionic polymerization, using a variety of techniques, and altering reaction conditions to produce the most desirable features in the resulting polymer. In an anionic polymerization, the initiator can be either an organometallic material such as an alkyl lithium, or the anion formed by electron transfer from a Group Ia metal to an aromatic material such as naphthalene. A preferred organometallic material is an alkyl lithium such as sec-butyl lithium; the polymerization is initiated by addition of the butyl anion to either the diene monomer or to the styrene.

When an alkyl lithium initiator is used, a homopolymer of one monomer, e.g., styrene, can be selectively prepared, with each polymer molecule having an anionic terminus, and lithium gegenion. The carbanionic terminus remains an active initiation site toward additional monomers. The resulting polymers, when monomer is completely depleted, will usually all be of similar molecular weight and composition, and the polymer product will be "monodisperse" (i.e., the ratio of weight average molecular weight to number average molecular weight is very nearly 1.0). At this point, addition of 1,3-butadiene, isoprene or other suitable anionically polymerizable monomer to the homopolystyrene-lithium "living" polymer produces a second segment which grows from the terminal anion site to produce a living di-block polymer having an anionic terminus, with lithium gegenion.

Subsequent introduction of additional styrene can produce a new (poly A)-block-(poly B)-block-(poly A), or A-B-A triblock polymer; higher orders of block polymers can be made by consecutive stepwise additions of different monomers in different sequences.

Alternatively, a living diblock polymer can be coupled by exposure to an agent such as a dialkyl dichlorosilane. When the carbanionic "heads" of two A-B diblock living polymers are coupled using such an agent, precipitation of LiCl occurs to give an A-B-A triblock polymer.

Block copolymers made by consecutive addition of styrene to give a relatively large homopolymer segment (A), followed by a diene to give a relatively large homopolymer segment (B), are referred to as (poly A)-block-(poly B) copolymers, or A-B diblock polymers.

When metal naphthalide is employed as initiator, the dianion formed by electron transfer from metal, e.g., Na, atoms to the naphthalene ring can generate dianions which may initiate polymerization, e.g. of monomer A, in two directions simultaneously.

Subsequent exposure of the poly (A) dianion to a second monomer (B) results in formation of a (poly B)-block-(poly A)-block-(poly B), or a B-A-B triblock polymeric dianion, which may continue to interact with additional anionically-polymerizable monomers of the same, or different chemical type, in the formation of higher order block polymers. Ordinary block copolymers are generally considered to have up to about 5 such blocks.

Usually, one monomer or another in a mixture will polymerize faster, leading to a segment that is richer in that monomer, interrupted by occasional incorporation of the other monomer. This can be used to build a type of polymer referred to as a "random block polymer", or "tapered block polymer. When a mixture of two different monomers is anionically polymerized in a non-polar paraffinic solvent, one will initiate selectively, and usually polymerize to produce a relatively short segment of homopolymer. Incorporation of the second monomer is inevitable, and this produces a short segment of different structure. Incorporation of the first monomer type then produces another short segment of that homopolymer, and the process continues, to give a "random" alternating distribution of relatively short segments of homopolymers, of different lengths. Random block polymers are generally considered to be those comprising more than 5 such blocks. At some point, one monomer will become depleted, favoring incorporation of the other, leading to ever longer blocks of homopolymer, producing a "tapered block copolymer." Intentional enrichment of a particular monomer in the latter, high-conversion stages of polymerization is often used to assure a tapered block copolymer configuration.

An alternative way of preparing random or tapered block copolymers involves initiation of styrene, and interrupting with periodic, or step, additions of diene monomer. The additions are programmed according to the relative reactivity ratios and rate constants of the styrene and particular diene monomer.

"Promoters" are electron-rich molecules that facilitate anionic initiation and polymerization rates while lessening the relative differences in rates between various monomers. Promoters also influence the way in which diene monomers are incorporated into the block polymer, generally favoring 1,2-polymerization of dienes over the normal 1,4-cis- addition.

Hydrogenation of the unsaturated block polymers initially obtained produces polymers that are more oxidatively and thermally stable. Techniques for accomplishing hydrogenation are well known to those of skill in the art. Briefly, hydrogenation is accomplished by contacting the copolymers with hydrogen at superatmospheric pressures in the presence of a metal catalyst such as colloidal nickel, palladium supported on charcoal, etc. and may be carried out as part of the overall production process, using finely divided, or supported, nickel catalyst. Other transition metals may also be used to effect the transformation. Hydrogenation is normally carried out to reduce approximately 94–96% of the olefinic unsaturation of the initial polymer. In general, it is preferred that these copolymers, for reasons of oxidative stability, contain no more than about 10%, preferably no more than 5% and more preferably no more than about 0.5% residual olefinic unsaturation on the basis of the total amount of olefinic double bonds present in the polymer prior to hydrogenation. Such unsaturation can be measured by a number of means well known to those of skill in the art, such as infrared or nuclear magnetic resonance spectroscopy. Most preferably, these copolymers contain no significant olefinic unsaturation. Aromatic unsaturation is not considered to be olefinic unsaturation within the context of this invention.

Often the arrangement of the various homopolymer blocks is dictated by the reaction conditions such as catalyst and polymerization characteristics of the monomers employed. Conditions for modifying arrangement of polymer blocks are well known to those of skill in the polymer art. Literature references relating to polymerization techniques and methods for preparing certain types of block polymers include:

1) "Encyclopedia of Polymer Science and Engineering", Wiley-Interscience Publishing, New York, (1986);
2) A. Noshay and J. E. McGrath, "Block Copolymers", Academic Press, New York, (1977);
3) R. J. Ceresa, ed., "Block and Graft Copolymerization", John Wiley and Sons, New York, (1976); and
4) D. J. Meier, ed., (Block Copolymers", MMI Press, Harwood Academic Publishers, New York, (1979).

Each of these is hereby incorporated herein by reference for relevant disclosures relating to block copolymers.

Examples of suitable regular diblock copolymers as set forth above include SHELLVIS® 40, and SHELLVIS® 50, both hydrogenated styrene-isoprene linear diblock copolymers, manufactured by Shell Chemical.

Examples of commercially available random block and tapered random block copolymers include the various GLISSOVISCAL® block copolymers manufactured by BASF. A previously available random block copolymer was Phil-Ad viscosity improver, manufactured by Phillips Petroleum.

The copolymers preferably have number average molecular weights ($\overline{M}_n$) in the range of about 20,000 to about 500,000, more preferably from about 30,000 to about 150,000. The weight average molecular weight ($\overline{M}_w$) for these copolymers is generally in the range of about 25,000 to about 500,000, preferably from about 50,000 to about 300,000, with characteristic narrow polydispersities (ratio of $\overline{M}_w$ to $\overline{M}_n$) of about 1.0 to about 1.4.

(3) Polymers of Alpha-Olefins

Another hydrocarbon polymer which can be grafted is a polyolefin, which consists in its main chain essentially of alpha olefin monomers. The polyolefins of this embodiment thus exclude polymers which have a large component of other types of monomers copolymerized in the main polymer backbone, such as ester monomers, acid monomers, and the like. The polyolefin may contain impurity amounts of such materials, e.g., less than 5% by weight, more often less than 1% by weight, preferably, less than 0.1% by weight of other monomers. Useful polymers include oil soluble or dispersible substantially saturated, including hydrogenated, polymers of alpha-olefins. By substantially saturated is meant that no more than about 5% of the carbon to carbon bonds in the polymer are unsaturated. Preferably, no more than 1% are unsaturated, more preferably, the polymer is essentially free of unsaturation.

These polymers are preferably copolymers, more preferably copolymers of ethylene and at least one other α-olefin having the formula $CH_2=CHR_1$ wherein $R_1$ is straight chain or branched chain alkyl radical comprising 1 to 26 carbon atoms. Preferably $R_1$ in the above formula is alkyl of from 1 to 8 carbon atoms, and more preferably is alkyl of from 1 to 2 carbon atoms.

The ethylene content is preferably in the range of 20 to 80 percent by weight, and more preferably 30 to 70 percent by weight. When propylene and/or 1-butene are employed as comonomer(s) with ethylene, the ethylene content of such copolymers is most preferably 45 to 65 percent, although higher or lower ethylene contents may be present. Most preferably, these polymers are substantially free of ethylene homopolymer, although they may exhibit a degree of crystallinity due to the presence of small crystalline polyethylene segments within their microstructure. Preferred polymers are copolymers of ethylene and propylene and ethylene and 1-butene.

The alpha olefin copolymer preferably has a number average molecular weight ($\overline{M}_n$) determined by gel-permeation chromatography employing polystyrene standards, ranging from about 30,000 to about 300,000, more often from about 50,000 to about 150,000, even more often from about 80,000 to 150,000. Exemplary polydispersity values ($\overline{M}_w/\overline{M}_n$) range from about 2.2 to about 2.5.

The polymers employed in this embodiment may generally be prepared substantially in accordance with procedures which are well known in the art. The polymers for use in this embodiment can be prepared by polymerizing monomer mixtures comprising alpha-olefins. The monomers are alpha-olefins containing from 2 to about 28 carbon atoms, and may be branched chain or linear. In a preferred embodiment, one monomer is ethylene, the comonomer being at least one $C_{3-28}$ alpha olefin, preferably $C_{3-8}$ alpha olefins. including monoolefins such as propylene, 1-butene, isobutene, 1-pentene, 1-hexene, 1-heptene, 1-octene, 1-nonene, 1-decene, propylene tetramer, diisobutylene, and triisobutylene.

Catalysts employed in the production of the reactant polymers are likewise well known. One broad class of catalysts particularly suitable for polymerization of α-olefins, comprises coordination catalysts such as Ziegler or Ziegler-Natta catalysts comprising a transition metal atom. Ziegler-Natta catalysts are composed of a combination of a transition metal atom with an organo aluminum halide and may be used with additional complexing agents.

Polymerization using coordination catalysis is generally conducted at temperatures ranging between 20° and 300° C., preferably between 30° and 200° C., often up to about 100° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation. Preferably, the polymerization will generally be completed at a pressure of 1 to 40 MPa (10 to 400 bar).

The polymerization may be conducted employing liquid monomer, such as liquid propylene, or mixtures of liquid monomers (such as mixtures of liquid propylene and 1-butene), as the reaction medium. Alternatively, polymerization may be accomplished in the presence of a hydrocarbon inert to the polymerization such as butane, pentane, isopentane, hexane, isooctane, decane, toluene, xylene, and the like.

When carrying out the polymerization in a batch-type fashion, the reaction diluent (if any) and the alpha-olefin comonomer(s) are charged at appropriate ratios to a suitable reactor. Care should be taken that all ingredients are dry, with the reactants typically being passed through molecular sieves or other drying means prior to their introduction into the reactor. Subsequently, component(s) of the catalyst are introduced while agitating the reaction mixture, thereby causing polymerization to commence. Alternatively, component(s) of the catalyst may be premixed in a solvent and then fed to the reactor. As polymer is being formed, additional monomers may be added to the reactor. Upon completion of the reaction, unreacted monomer and solvent are either flashed or distilled off, if necessary by vacuum, and the copolymer withdrawn from the reactor.

The polymerization may be conducted in a continuous manner by simultaneously feeding the reaction diluent (if employed), monomers, component(s) of the catalyst to a reactor and withdrawing solvent, unreacted monomer and polymer from the reactor so as to allow a residence time of ingredients long enough for forming polymer of the desired molecular weight; and separating the polymer from the reaction mixture.

In those situations wherein the molecular weight of the polymer product that would be produced at a given set of operating conditions is higher than desired, any of the techniques known in the prior art for control of molecular weight, such as the use of hydrogen and/or polymerization temperature control, may be used.

However, the polymers are preferably formed in the substantial absence of added $H_2$ gas, that is $H_2$ gas added in amounts effective to substantially reduce the polymer molecular weight.

The polymers can be random copolymers, block copolymers, and random block copolymers. Ethylene propylene copolymers are usually random copolymers.

Numerous United States patents, including the following, describe the preparation of copolymers of alpha olefins.

| | |
|---|---|
| 3,513,096 | 4,068,057 |
| 3,551,336 | 4,081,391 |
| 3,562,160 | 4,089,794 |
| 3,607,749 | 4,098,710 |
| 3,634,249 | 4,113,636 |
| 3,637,503 | 4,132,661 |
| 3,992,310 | 4,137,185 |
| 4,031,020 | 4,138,370 |
| 4,068,056 | 4,144,181 |

Copolymers of ethylene with higher alpha olefins are the most common copolymers of aliphatic olefins and ethylene-propylene copolymers are the most common ethylene-alpha-olefin copolymers and are preferred for use in this invention. A description of an ethylene-propylene copolymer appears in U.S. Pat. No. 4,137,185 which is hereby incorporated herein by reference.

Useful ethylene-alpha olefin, usually ethylene-propylene, copolymers are commercially available from numerous sources including the Exxon, Texaco and Lubrizol Corporations.

(4) Olefin-Diene Copolymers

Another useful hydrocarbon monomer is one derived from olefins, especially lower olefins, and dienes. Dienes may be non-conjugated or conjugated. Useful olefins and dienes are the same as those described hereinabove and hereinafter in discussions of other polymer types.

In one embodiment, the copolymer is an ethylene-lower olefin-diene copolymer. As used herein, the term lower refers to groups or compounds containing no more than 8 carbon atoms. Preferably, the diene is non-conjugated.

There are numerous commercial sources for lower olefin-diene polymers. For example, ORTHOLEUM® 2052 (a product marketed by the DuPont Company) which is a terpolymer having an ethylene:propylene weight ratio of about 57:43 and containing 4–5 weight % of groups derived from 1–4 hexadiene monomer, and numerous other such materials are readily available. Olefin-diene copolymers and methods for their preparation are described in numerous patents including the following U.S. Patents:

U.S. Pat. No. 3,291,780
U.S. Pat. No. 3,300,459
U.S. Pat. No. 3,598,738
U.S. Pat. No. 4,026,809
U.S. Pat. No. 4,032,700
U.S. Pat. No. 4,156,061
U.S. Pat. No. 3,320,019
U.S. Pat. No. 4,357,250

U.S. Pat. No. 3,598,738, which describes the preparation of ethylene-propylene-1,4-hexadiene terpolymers, is illustrative. This patent also lists numerous references describing the use of various polymerization catalysts.

Another useful polymer is an olefin-conjugated diene copolymer. An example of such a polymer is butyl rubber, an isobutylene-isoprene copolymer. Butyl rubbers are produced using acidic catalysts, such as aluminum chloride, boron trifluoride, and other Lewis acids.

Details of various types of polymers, reaction conditions, physical properties, and the like are provided in the above patents and in numerous books, including:

"Riegel's Handbook of Industrial Chemistry", 7th edition, James A. Kent Ed., Van Nostrand Reinhold Co., New York (1974), Chapters 9 and 10, P. J. Flory, "Principles of Polymer Chemistry", Cornell University Press, Ithaca, N.Y. (1953), "Kirk-Othmer Encyclopedia of Chemical Technology", 3rd edition, Vol. 8 (Elastomers, Synthetic, and various subheadings thereunder), John Wiley and Sons, New York (1979).

Each of the above-mentioned books and patents is hereby expressly incorporated herein by reference for relevant disclosures contained therein.

Polymerization can also be effected using free radical initiators in a well-known process, generally employing higher pressures than used with coordination catalysts.

(5) Star Polymer

Star polymers are polymers comprising a nucleus and polymeric arms. Common nuclei include polyalkenyl compounds, usually compounds having at least two non-conjugated alkenyl groups, usually groups attached to electron withdrawing groups, e.g., aromatic nuclei. The polymeric arms are often homopolymers and copolymers of conjugated dienes and monoalkenyl arenes and mixtures thereof.

The polymers thus comprise a poly(polyvinylic) coupling agent nucleus with polymeric arms extending outward therefrom. The star polymers are usually hydrogenated such that at least 80% of the covalent carbon-carbon bonds are saturated, more often at least 90% and even more preferably, at least 95% are saturated.

The polyvinylic compounds making up the nucleus are illustrated by polyalkenyl arenes, e.g., divinyl benzene and poly vinyl aliphatic compounds.

Dienes making up the polymeric arms are illustrated by, butadiene, isoprene and the like. Monoalkenyl compounds include, for example, styrene and alkylated derivatives thereof.

Star polymers are well known in the art. Such material and methods for preparing same are described in numerous publications and patents, including the following United States patents which are hereby incorporated herein by reference for relevant disclosures contained therein:

U.S. Pat. No. 4,116,917,
U.S. Pat. No. 4,141,847,
U.S. Pat. No. 4,346,193,
U.S. Pat. No. 4,358,565,
and U.S. Pat. No. 4,409,120.

Star polymers are commercially available, for example as SHELLVIS® 200 sold by Shell Chemical Co.

The aforementioned hydrocarbon polymers can also be prepared employing a class of catalysts referred to as metallocene catalysts, or constrained geometry catalysts. Polymers prepared using these catalysts tend to have lower polydispersity values arising from more narrow molecular weight distributions than, for example, those derived from more conventional Ziegler-Natta catalyst derived polymers.

Nitrogen Containing Monomers

The hydrocarbon polymer backbone, while contributing to the viscosity-improving characteristics of the products of this invention, by itself contributes little toward dispersancy in lubricants. The nitrogen containing units which are derived from nitrogen containing monomers provide the bulk of the contribution toward dispersancy properties of the dispersant viscosity improvers of this invention.

The (Meth)Acrylamide Monomer

One of the nitrogen containing units graft polymerized onto the hydrocarbon backbone is derived from at least one of a neutral N-(lower hydrocarbyl group)- or a neutral N,N-di-(lower hydrocarbyl group)- (meth)acrylamide. By "neutral" is meant that the (meth)acrylamide does not contain any additional amine site which contributes to basicity in the sense of a titratable amino group.

The expression "(meth)acrylamide" with "meth" included within parenthesis, includes both acrylamides and methacrylarnides. The expression "acrylamide" used alone does not include methacrylamides. Likewise, the expression "methacrylamide" where "meth" is not included within parenthesis does not include acrylamides.

Each lower hydrocarbyl group substituent on the nitrogen of the amide group contains no more than 7 carbon atoms, and the total number of carbon atoms in the lower hydrocarbyl groups does not exceed 9. Thus, for example, an N-alkyl substituted(meth)acrylamide may contain a maximum of seven carbon atoms in the alkyl group. The total number of carbon atoms in the two alkyl groups of an N,N-dialkyl (meth)acrylamide does not exceed 9.

The N-hydrocarbyl group substituents may be aromatic and aliphatic, including cycloaliphatic, groups, preferably aliphatic groups and most preferably, alkyl groups.

Each lower hydrocarbyl group may contain up to one oxygen or sulfur containing group or atom. Such groups include ether groups, thioether groups, carboxylic acid groups, ester groups, keto carbonyl groups, aldehyde groups, mercapto groups and alcohol groups. The total number of carbon atoms in these groups includes carbon atoms making up the hetero groups such as carbonyl carbons, etc.

Illustrative (meth)acrylamide monomers include N-phenyl acrylamide, N-phenyl-N-methyl acrylamide, N-methyl acrylamide, N,N-dimethylacrylamide, N-allyl acrylamide, N-(t-butyl) acrylamide, N-heptyl acrylamide, N-methyl-N-heptyl acrylamide, N-propyl acrylamide, N,N-diethyl acrylamide, diacetone acrylamide, and the corresponding methacrylamides such as N-methyl- and N,N-dimethyl methacrylamide, and the like. Preferred are N-methyl-, N-ethyl-, N,N-dimethyl-, N,N-diethyl-, and N-t-butyl-(meth)acrylamides and diacetone acrylamide.

The Vinylic Nitrogen Containing Heterocycle

The other nitrogen containing units graft polymerized onto the hydrocarbon backbone are derived from at least one free radical polymerizable vinylic nitrogen containing heterocyclic monomer. These include both N-vinyl and C-vinyl nitrogen containing heterocyclics.

Examples of these include N-vinyl carbazole, the vinylpyridines, N-vinyl pyrrolidinone, N-vinyl thiopyrrodinone, N-vinyl oxazolidinone, N-vinyl imidazole, the 2-vinyl dihydro-oxazines, 2-vinyl oxazoles, 2-vinyl oxazolines, N-vinyl caprolactam, vinyl piperazine, and the like. N-vinyl imidazole and N-vinyl pyrrolidone are preferred.

N-vinyl imidazole is particularly difficult to graft polymerize onto non-polar hydrocarbon polymers. The process of co-grafting with the acrylamide monomers, particularly N-methyl acrylamide, N-ethyl acrylamide and N,N-dimethylacrylamide, is especially useful.

The graft copolymers of this invention have from about 0.25 to about 5 moles, preferably from about 0.5 to about 4 moles, and especially from about 1 to about 3 moles of (meth)acrylamide units per mole of vinylic nitrogen containing heterocyclic units.

The graft copolymer comprises a total of from about 0.2 to about 5 moles, preferably from about 0.4 to about 3 moles, and more often from about 0.5 to about 2 moles nitrogen containing units per 10,000 weight average ($\overline{M}_w$) molecular weight units of hydrocarbon polymer.

The Process

The graft copolymers of this invention can be prepared by a process which comprises simultaneously grafting onto a hydrocarbon polymer, under free radical conditions, at least two nitrogen containing monomers, wherein one of the monomers comprises at least one of a neutral N-(lower hydrocarbyl group)- (meth)acrylamide and a neutral N,N-di-(lower hydrocarbyl group)- (meth)acrylamide and one of the monomers comprises at least one vinylic nitrogen containing heterocyclic compound. Exemplary and preferred hydrocarbon polymers and nitrogen containing monomers are those set forth hereinabove.

The grafting is conducted under free radical conditions employing a free radical initiator. Free radical initiators are described in detal hereinbelow.

The grafting process is typically conducted at an elevated temperature, generally from about 85° C. up to the lowest decomposition temperature of reactants or product, preferably from about 100° C. to about 165° C. and more preferably from about 120° C. to about 145° C. Considerations for determining reaction temperatures include reactivity of the system and the half-life of the initiator at a particular temperature.

Free Radical Initiators

As noted herein, the graft polymerizations providing the graft copolymers of this invention are conducted under free radical conditions employing a free radical initiator. A wide variety of free radical initiators, sometimes referred to as free radical generating reagents, are well known to those skilled in the art. These include diazo compounds, peroxy compounds, nitroxyl radicals and high energy radiation. Radical grafting is preferably carried out using free radical initiators such as peroxides, hydroperoxides, diacyl peroxides, peroxy esters and azo compounds which decompose thermally within the grafting temperature range to provide said free radicals.

Numerous free-radical initiators are mentioned in the above-referenced tests by Flory and by Bovey and Winslow. An extensive listing of free-radical initiators appears in J. Brandrup and E. H. Immergut, Editor, "Polymer Handbook", 2nd edition, John Wiley and Sons, New York (1975), pages II-1 to II-40. Preferred free radical generating reagents include t-butyl peroxide, t-butylhydroperoxide, t-butyl perbenzoate, t-amyl peroxide, cumyl peroxide, t-butyl peroctoate, t-butyl-m-chloroperbenzoate, benzoyl peroxide, sec-butylperoxydicarbonate, azobisisobutyronitrile, and azobisisovaleronitrile.

The free-radical initiators are generally used in an amount from about 0.01 to about 10 percent by weight based on the total weight of the reactants. Preferably, the initiators are used at about 0.05 to about 1 percent by weight.

The choice of free radical generating reagent can be an important consideration. For example, when a polymer undergoing grafting with a monomer is diluted with a solvent such as a hydrocarbon oil, grafting of the monomer onto the oil diluent may occur. It has been observed that the choice of initiator affects the extent of grafting of the monomer onto the oil diluent. Reducing the amount of monomer grafted onto the diluent usually results in an increased amount of monomer grafted onto the polymer. Improved efficiency of monomer grafting onto substantially saturated copolymer resins has been described by Lange et al., in U.S. Pat. No. 5,298,565 which is hereby incorporated herein by reference for relevant disclosures in this regard.

Azo group containing initiators, such as Vazo® polymerization initiators (DuPont) employed in the grafting process at about 95° C. result in a much higher degree of grafting onto the polymer than do peroxide initiators such as t-butyl peroxide, employed at about 150–160° C. Peresters are particularly effective in the free-radical grafting process.

The grafting may be conducted in solution. The solvent may comprise a wide variety of materials but preferred are hydrocarbon solvents. Preferably, the grafting is conducted employing a generally non-reactive solvent or diluent; i.e., one which does not undergo any significant reaction with any of the reactants or products of this invention. Particularly useful solvents/diluents include substantially saturated aliphatic solvents that are relatively free of abstractable tertiary, allylic or benzylic hydrogen atoms. Specific examples include hydrorefined and hydrotreated mineral oils, polyalphaolefins, volatile alkanes, and the like. Use of these solvents prevents significant grafting of the nitrogen-containing monomers onto the diluent. While for many applications the choice of solvent is not critical, it is particularly preferred that when the graft copolymer is intended for use as a dispersant viscosity improver for lubricating oil compositions, the a solvent, if used, is a non-reactive solvent.

Diluents that are not highly saturated, for example, napthenic oils, may be used. However, when these diluents are used, the products obtained frequently suffer from reduced grafting onto the hydrocarbon polymer. This can be alleviated to some extent by employing additional monomer reactant to increase the number of monomers grafted onto the polymer.

A variety of solvents may be used including those which are sufficiently volatile such that they may be conveniently removed from the graft copolymer. Alternatively, the reaction may be conducted in an oil of lubricating viscosity which then serves as a diluent to facilitate handling of materials during preparation of the copolymer and of the resulting copolymer. Copolymers containing a lubricating oil as diluent may also be prepared by simultaneously removing a volatile diluent and replacing same with an oil of lubricating viscosity.

In an alternative embodiment, the copolymer may be prepared by conducting the reaction in an extruder which provides mechanical shear. When an extruder is employed, a neat (diluent free) product may be obtained.

The following examples are intended to illustrate several compositions of this invention as well as means for preparing same. Unless indicated otherwise, all parts are parts by weight, temperatures are in degrees Celsius (° C.), and pressures are atmospheric. When referring to parts by volume, the relationship is as parts by weight in grams to parts by volume in milliliters. Filtrations are conducted using a diatomaceous earth filter aid. All analytical values are by analysis. Viscosity is measured using ASTM-D445 procedure. It is to be understood that these examples are only intended to illustrate compositions and procedures of the invention and are not intended to limit the scope of the invention.

EXAMPLE 1

A reactor equipped with a stirrer, thermometer, water cooled reflux condenser and sub-surface gas inlet is charged with 3000 parts of a 10% by weight in mineral oil (PetroCanada 100N, ~100% saturated) solution of an ethylene-propylene-dicyclopentadiene copolymer having $\overline{M}_n$ 89,000 and $\overline{M}_w$ 200,000 comprising 51 weight % ethylene units and 2 weight % dicyclopentadiene units. The materials are heated, under $N_2$ to 130° C. To one addition funnel are added a mixture of 7.5 parts N-vinyl imidazole and 15 parts N,N-dimethyl acrylamide in 50 parts by volume toluene and to a second addition funnel are added 15 parts t-butyl peroxybenzoate in 25 parts by volume toluene. While maintaining $N_2$, the two toluene solutions are added dropwise, simultaneously, over 2 hours. After the additions are completed, the materials are heated while maintaining $N_2$, at 130° C. for 4 hours, stripped to 150° C. then vacuum stripped to 150° C. at 20 mm Hg pressure. The residue is filtered providing a product containing 0.158% N, total base number=1.28 and kinematic viscosity (100° C.) 2830 centistokes.

EXAMPLE 2

A mixture of 610 parts of the product of Example 1 and 6.1 parts of an 85% active primary straight chain alkyl benzene sulfonic acid are stirred, under $N_2$, at 130° C. for 2 hours. Kinematic viscosity (100° C.)=4200 centistokes.

EXAMPLE 3

A reactor equipped with a stirrer, thermometer, water cooled reflux condenser and sub-surface gas inlet is charged with 1000 parts of 9% by weight in mineral oil (Exxon 100N, ~75% saturated) solution of an ethylene-propylene-dicyclopentadiene copolymer having $\overline{M}_n$ 140,000 and $\overline{M}_w$ 330,000 comprising 51 weight % ethylene units and 2 weight % dicyclopentadiene units. The materials are heated, under $N_2$, to 130° C. To a first addition funnel are charged 1.5 parts 1-vinylimidazole, 3 parts N,N-dimethylacrylamide and 14 parts toluene. To a second addition funnel are charged 4.5 parts t-butyl peroxybenzoate and 14 parts toluene. While maintaining $N_2$ throughout the reaction, dropwise addition of the peroxybenzoate is begun followed 0.1 hour later by dropwise addition of the monomers. Dropwise addition from the two addition funnels is carried out for 1.25 hours then the batch is held at 135° C. for 2.5 hours. The apparatus is then set up for stripping. The materials are purged with $N_2$ and heated to 145° C. while collecting 10.3 parts distillate. The product contains 0.07% N.

EXAMPLE 4

The procedure of Example 3 is repeated with 1000 parts of the polymer solution, 2.25 parts 1-vinylimidazole, 4.5 parts N,N-dimethylacrylamide and 4.8 parts t-butyl peroxybenzoate. Toluene is used in sufficient amount to bring the volume in each addition funnel to 20 parts by volume. Product contains 0.125% N.

EXAMPLE 5

The procedure of Example 3 is repeated with 1000 parts of the polymer solution, 1.5 parts 1-vinylimidazole, 3 parts N,N-dimethylacrylamide and 4.5 parts t-butyl peroxybenzoate. The additions are completed in 0.7 hour. After the initial 2.5 hour heating period, an additional 0.5 part t-butyl peroxybenzoate is added and heating at 135° C. is continued for 3 more hours. The product contains 0.09% N.

EXAMPLE 6

The procedure of Example 3 is repeated except the polymer is dissolved in PetroCanada 100N mineral oil (~100% saturated). The product contains 0.04% N.

EXAMPLE 7

A reactor equipped with a stirrer, thermowell, water cooled reflux condenser and sub-surface gas inlet is charged with 1000 parts of 10% by weight in mineral oil (150N, ~88% saturated) solution of a hydrogenated styrene-butadiene random block copolymer having molecular weight determined by GPC of about 120,000 (GLISSOVISCAL® 5260, BASF). The materials are heated, under $N_2$, to 130° C. To a first addition funnel are charged 1.67 parts 1-vinylimidazole, 3.33 parts N,N-dimethylacrylamide and 15 parts toluene. To a second addition funnel are charged 5.5 parts t-butyl peroxybenzoate and 15 parts toluene. While maintaining $N_2$ throughout the reaction, dropwise addition of the peroxybenzoate is begun followed 0.1 hour later by dropwise addition of the monomers. Dropwise addition from the two addition funnels is carried out simultaneously and is completed in 1.3 hours. After addition is completed, the batch is heated to 135° C. and is held for 2 hours. An additional 1 part t-butyl peroxybenzoate is added and the batch is maintained at 135° C. for 2 hours, $N_2$ blown at 145C for 3 hours collecting 10 parts distillate, then filtered. The material contains 0.09% N.

EXAMPLE 8

A reactor equipped with a stirrer, thermowell, water cooled reflux condenser and sub-surface gas inlet is charged with 1000 parts of 10% by weight in mineral oil (PetroCanada 100N, ~100% saturated) solution of the hydrogenated copolymer of Example 7. The materials are heated, under N2, to 130° C. To a first addition funnel are charged 1.67 parts 1-vinylimidazole, 3.33 parts N,N-dimethylacrylamide and 15 parts toluene. To a second addition funnel are charged 5.5 parts t-butyl peroxybenzoate and 15 parts toluene. While maintaining $N_2$ throughout the reaction, dropwise addition of the peroxybenzoate is begun followed 0.1 hour later by dropwise addition of the monomers. Dropwise addition from the two addition funnels is carried out simultaneously and is completed in 1.25 hours. After addition is completed, the batch is heated to 135° C. and is held for 3.5 hours, then is heated to 145° C. and $N_2$ blown for 2 hours, collecting 11 parts distillate. The product contains 0.09% N.

EXAMPLE 9

A reactor equipped with a stirrer, thermowell, water cooled reflux condenser and sub-surface gas inlet is charged with 1000 parts of 9% by weight in mineral oil (100N, ~78% saturated) solution of a hydrogenated styrene-butadiene linear tapered block copolymer having molecular weight determined by GPC of about 140,000 (GLISSOVISCAL® SGH, BASF). The materials are heated, under $N_2$, to 130° C. To a first addition funnel are charged 1.5 parts 1-vinylimidazole, 3.0 parts N,N-dimethylacrylamide and 15 parts toluene. To a second addition funnel are charged 5.0 parts t-butyl peroxybenzoate and 15 parts toluene. While maintaining $N_2$ throughout the reaction, dropwise addition of the peroxybenzoate is begun followed 0.1 hour later by dropwise addition of the monomers. Dropwise addition from the two addition funnels is carried out simultaneously and is completed in 1.25 hours. After addition is completed, the batch is heated to 135° C. and is held for 2.5 hours followed by $N_2$ blowing at 145° C. for 3 hours while collecting 5 parts distillate. The batch contains 0.077% N.

EXAMPLE 10

A reactor equipped with a stirrer, thermowell, water cooled reflux condenser and sub-surface gas inlet is charged with 1000 parts of 7% by weight in mineral oil (100N, ~79% saturated) solution of a hydrogenated styrene-isoprene linear diblock copolymer having molecular weight determined by GPC of about 200,000 (SHELLVIS® 40 Shell Chemical Co.). The materials are heated, under $N_2$, to 130° C. To a first addition funnel are charged 1.17 parts 1-vinylirnidazole, 2.33 parts N,N-dimethylacrylamide and 15 parts toluene. To a second addition funnel are charged 4.5 parts t-butyl peroxybenzoate and 15 parts toluene. While maintaining N2 throughout the reaction, dropwise addition of the peroxybenzoate is begun followed 0.1 hour later by dropwise addition of the monomers. Dropwise addition from the two addition funnels is carried out simultaneously and is completed in 1.25 hours. After addition is completed, the batch is heated at 135° C. for 2.5 hours then is $N_2$ blown at 145° C. for 3 hours. The product contains 0.062% N.

EXAMPLE 11

A reactor equipped with a stirrer, thermowell, water cooled reflux condenser and sub-surface gas inlet is charged with 1000 parts of 14% by weight in mineral oil (100N, ~79% saturated) solution of a hydrogenated isoprene radial copolymer having molecular weight determined by GPC using polystyrene standard of about $\overline{M}_n$=414,000 and $\overline{M}_w$=541,000, (SHELLVIS® 250, Shell Chemical. Co.). The materials are heated, under $N_2$, to 130° C. To a first addition funnel are charged 2.33 parts 1-vinylimidazole, 4.67 parts N,N-dimethylacrylamide and 15 parts toluene. To a second addition funnel are charged 7 parts t-butyl peroxybenzoate and 15 parts toluene. While maintaining $N_2$ throughout the reaction, dropwise addition of the peroxybenzoate is begun followed 0.1 hour later by dropwise addition of the monomers. Dropwise addition from the two addition funnels is conducted simultaneously for 1.25 hours then the batch is heated at 135° C. for 2.5 hours then $N_2$ blown at 145° C. for 2 hours while collecting 5 parts distillate. The residue is filtered. The product contains 0.12% N.

EXAMPLE 12

The procedure of Example 11 is repeated employing 900 parts of a 14% by weight in mineral oil (PetroCanada 100N, ~100% saturated) solution of Shellvis 250 polymer, 2.10 parts 1-vinylimidazole, 4.20 parts N,N-dimethylacrylamide, 6.3 parts t-butyl peroxybenzoate and, in each addition funnel, 15 parts toluene. After addition of monomers and initiator, the material are heated at 130° C. for 4 hours then $N_2$ purged at 145° C. for 2 hours while collecting 12 parts distillate. The product contains 0.14% N.

Comparative Example

A reactor equipped with a stirrer, thermometer, water cooled reflux condenser and sub-surface gas inlet is charged with 1000 parts of 14.5% by weight in mineral oil (Exxon 100N, ~75% saturated) solution of an ethylene-propylene-dicyclopentadiene copolymer having $\overline{M}_n$ 140,000 and $\overline{M}_w$ 330,000 comprising 51 weight % ethylene units and 2 weight % dicyclopentadiene units and 350 parts of the Exxon 100N mineral oil. The solution is heated, under $N_2$, to 80° C. whereupon 150 parts toluene and 2.5 parts n-dodecyl mercaptan. To a first addition funnel is charged 10 parts N-vinylimidazole dissolved in 25 parts toluene. To a second addition funnel is charged 7.5 parts t-butyl peroxybenzoate dissolved in 25 parts toluene. The temperature is increased to 130° C. then while maintaining $N_2$ throughout the reaction, simultaneous dropwise addition of the peroxybenzoate and the N-vinylimidazole from the two addition funnels is carried out for 1.5 hours then the batch is held at 130° C. for 2.5 hours while maintaining $N_2$. The apparatus is then set up for stripping. The materials are vacuum stripped to 145° C. and 20 mm Hg, diluted with an additional Exxon 100N oil and filtered distill. The product contains 0.043% N.

The products of these Examples are evaluated using a screening test designed to determine the relative dispersancy of dispersants and dispersant viscosity improvers. Each is dissolved in a 100N mineral oil at several different active (neat, diluent free) chemical levels. A fixed amount of sludge solution is incorporated into the samples. After standing for a period of time, each is examined to determine which is the first in each series to exhibit fallout of the sludge. The first sample number to experience fallout is report. Results are reported as numbers ranging from ≦1 to ≧6 where ≦1 signifies a result where fallout is observed at the highest level of dispersant and ≧6 signifies a result where fallout is not observed even at the lowest dispersant level. Results of the tests are reported in the following table:

| Product of Example | Rating |
| --- | --- |
| 1 | >6 |
| 2 | 6 |
| 3 | 5 |
| 4 | 5 |
| 5 | 4 |
| 6 | >6 |
| 7 | 4 |
| 8 | 5 |
| 9 | 4 |
| 10 | <1 |
| 11 | 5 |
| 12 | 6 |

Lubricating oil compositions of this invention comprise a major amount of an oil of lubrication viscosity and a minor amount of the nitrogen containing graft copolymers of this invention. A major amount is the greatest amount. For example, a composition containing 40% by weight of an oil of lubricating viscosity, and the balance being made up of a variety of other materials, each present in amount less that 40% by weight of the composition, is considered as comprising a major amount of an oil of lubricating viscosity. More frequently, a major amount is meant more than 50% of the total weight of a composition. Thus, for example, 51%, 80% and 99% are major amounts, and minor amounts are less than 50% by weight. Corresponding example of minor amounts are 1%, 20% and 49%. Generally, the lubricating oil compositions of this invention comprise a minor, viscosity improving and dispersant amount of the graft copolymer. Typically, lubricating oil compositions of this invention comprise, on a neat chemical basis, from about 0.01 to about 10% by weight, more often from about 0.20% to about 5% by weight of the nitrogen containing copolymer.

This invention also relates to a method for improving the viscometrics and dispersancy characteristics of a lubricating oil composition, said method comprising incorporating therein a minor, viscosity improving and dispersant amount of the graft copolymers of this invention.

Other Additives

Additive concentrates and lubricating oil compositions of this invention may contain other additives. The use of such additives is optional and the presence thereof in the compositions of this invention will depend on the particular use and level of performance required. Thus the other additive may be included or excluded. Additive concentrates typically comprise from about 5% to about 80% by weight of interpolymer and from about 20% to about 95% by weight of a substantially, inert, normally liquid, organic diluent.

Lubricating oil compositions often comprise zinc salts of a dithiophosphoric acid, often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

Other additives that may optionally be used in the lubricating oils of this invention include, for example, detergents, dispersants, supplemental viscosity improvers, oxidation inhibiting agents, corrosion inhibiting agents, pour point depressing agents, extreme pressure agents, anti-wear agents, color stabilizers, friction modifiers, and anti-foam agents. Extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Other oxidation inhibiting agents include materials such as alkylated diphenyl amines, hindered phenols, especially those having tertiary alkyl groups such as tertiary butyl groups in the position ortho to the phenolic -OH group, and others. Such materials are well known to those of skill in the art.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, hydrogenated diene polymers, polyalkyl styrenes, esterified styrene-maleic anhydride copolymers, hydrogenated alkenylarene-conjugated diene copolymers and polyolefins. Multifunctional viscosity improvers, which also have dispersant and/or antioxidancy properties are known and may optionally be used in addition to the products of this invention. Such products are described in numerous publications including those mentioned in the Background of the Invention. Each of these publications is hereby expressly incorporated by reference.

Pour point depressants may be included in the additive concentrates and lubricating oils described herein. Those which may be used are described in the literature and are well-known to those skilled in the art; see for example, page 8 of "Lubricant Additives" by C. V. Smalheer and R. Kennedy Smith (Lezius-Hiles Company Publisher, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; 3,250,715; and 5,707,943 which are expressly incorporated herein by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by a least one direct carbon-to-phosphorus linkage.

The term "basic salt" is used to designate metal salts wherein the metal is present in stoichiometrically larger amounts than the organic acid radical. The relative amount of metal present in "basic salts" is frequently indicated by the expression "metal ratio" (abbreviated MR), which is defined as the number of equivalents of metal present compared to a "normal", stoichiometric amount. Thus, for example, a basic salt containing twice the amount of metal compared to the stoichiometric amount, has a metal ratio (MR) of 2. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,399,141 | 3,574,101 |
| 3,184,474 | 3,415,750 | 3,576,743 |
| 3,215,707 | 3,433,744 | 3,630,904 |
| 3,219,666 | 3,444,170 | 3,632,510 |
| 3,271,310 | 3,448,048 | 3,632,511 |
| 3,272,746 | 3,448,049 | 3,697,428 |
| 3,281,357 | 3,451,933 | 3,725,441 |
| 3,306,908 | 3,454,607 | 4,194,886 |
| 3,311,558 | 3,467,668 | 4,234,435 |
| 3,316,177 | 3,501,405 | 4,491,527 |
| 3,340,281 | 3,522,179 | 5,696,060 |
| 3,341,542 | 3,541,012 | 5,696,067 |
| 3,346,493 | 3,541,678 | 5,779,742 |
| 3,351,552 | 3,542,680 | RE 26,433 |
| 3,381,022 | 3,567,637 | |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Polymers and copolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated herein by reference for their disclosures of ashless dispersants.

The above-illustrated other additives may each be present in lubricating compositions at a concentration of as little as 0.001% by weight, usually ranging from about 0.01% to about 20% by weight. In most instances, they each contribute from about 0.1% to about 10% by weight, more often up to about 5% by weight.

Additive Concentrates

The various additive compositions of this invention described herein can be added directly to the oil of lubricating viscosity. Preferably, however, they are diluted with a substantially inert, normally liquid organic diluent such as mineral oil, a synthetic oil such as a polyalphaolefin, naphtha, benzene, toluene or xylene, to form an additive concentrate. These concentrates comprise from about 0.1 to about 60% by weight, frequently from about 5% to about 50% by weight, more often from about 5% to about 30% by weight of the copolymers of this invention with the balance comprising the substantially inert, normally liquid organic diluent, and may contain, in addition, one or more other additives known in the art or described hereinabove.

The additive concentrate may comprise from about 3% to about 10% by weight of at least one non-graft polymerized hydrocarbon polymer. The additive concentrate may also comprise from about 0.5 to about 5% by weight, based on the total weight of the additive concentrate, of at least one pour point depressant.

Additive concentrates are prepared by mixing together the desired components, often at elevated temperatures, usually less than 150° C., often no more than about 130° C., frequently no more than about 100° C.

The Oil of Lubricating Viscosity

The lubricating compositions and methods of this invention employ an oil of lubricating viscosity, including natural and synthetic oils and mixtures thereof.

Natural oils include animal oils and vegetable oils (e.g., lard oil, castor oil) as well as mineral lubricating oils such as liquid petroleum oils and solvent-treated, acid treated, and/or hydrotreated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl, (e.g., biphenyls, terphenyls, alkylated polyphenyls, etc.), alkylated diphenyl ethers and alkylated diphenyl sulfides and the derivatives, analogs and homologues thereof and the like.

Alkylene oxide polymers and interpolymers and derivatives thereof where their terminal hydroxyl groups have been modified by esterification, etherification, etc., constitute another useful class of known synthetic lubricating oils.

Another suitable class of synthetic lubricating oils that can be used comprises the esters of di- and polycarboxylic acids and those made from $C_5$ to $C_{20}$ monocarboxylic acids and polyols and polyolethers.

Other synthetic lubricating oils include liquid esters of phosphorus-containing acids, polymeric tetrahydrofurans and the like, silicon-based oils such as the polyalkyl-polyaryl-, polyalkoxy-, or polyaryloxy-siloxane oils and silicate oils.

Unrefined, refined and rerefined oils, either natural or synthetic (as well as mixtures of two or more of any of these) of the type disclosed hereinabove can be used in the compositions of the present invention. Unrefined oils are those obtained directly from natural or synthetic sources without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin, III, U.S. Pat. No. 4,326,972 and European Patent Publication 107,282, both of which are hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

The following examples illustrate lubricating oil compositions of this invention. All parts are parts by weight. Amounts are on an oil or diluent free basis, except for products of Examples set forth herein which amounts are as prepared, including diluent, if any.

EXAMPLES A–B

A master additive concentrate is prepared by mixing together 25.74 parts of a polyisobutylene ($\overline{M}_n$ ~1600) substituted succinic anhydride-ethylene polyamines bottoms reaction product, 6.84 parts of a zinc salt of mixed methyl amyl-isopropyl dithiophosphate, 4.80 parts di(nonylphenyl) amine, 6.72 parts calcium overbased (MR ~2.3) sulfurized alkyl phenol, 0.98 parts calcium overbased (MR ~11) alkyl benzene sulfonic acid, 11.88 parts calcium overbased (MR 2.8) alkyl benzene sulfonic acid, 0.08 parts of a kerosene solution of a commercial silicone antifoam and sufficient mineral oil to make the total 100 parts by weight.

Lubricating oil compositions are prepared by mixing 12.49 parts of the master additive concentrate, 0.20 parts of a 65% in mineral oil polymethacrylate pour point depressant and 7.5 parts of the product of the Example indicated in the following table into sufficient mineral oil (Exxon SAE 10W-40) to prepare 100 parts of lubricating oil.

TABLE 1

|  | Example | |
| --- | --- | --- |
|  | A | B |
| Product of Example | 1 | 2 |

EXAMPLE C

A master additive concentrate is prepared by mixing together 12.90 parts of a polyisobutylene ($\overline{M}_n$ ~1600) substituted succinic anhydride-ethylene polyamines bottoms reaction product, 11.25 parts of a zinc salt of mixed methyl amyl-isopropyl dithiophosphate, 6.49 parts calcium overbased (MR ~3.5) sulfurized alkyl phenol, 7.48 parts calcium overbased (MR ~11) alkyl benzene sulfonic acid, 9.29 parts calcium overbased (MR 2.8) alkyl benzene sulfonic acid, 4.21 parts calcium overbased (MR ~1.1) sulfurized alkyl phenol, 0.32 parts of an S-alkyl-2,5-dimercapto-1,3,4-thiadiazole, 5.38 parts of sulfurized butadiene-butyl acrylate Diels-Alder adduct, 0.11 parts of a kerosene solution of a commercial silicone antifoam and sufficient mineral oil to make the total 100 parts by weight.

Lubricating oil compositions are prepared by mixing 9.30 parts of the master additive concentrate, 0.08 parts of a styrene maleate copolymer neutralized with aminopropylmorpholine, and 8 parts of the product of Example 4 into sufficient mineral oil (Exxon SAE 10W-40) to prepare 100 parts of lubricating oil.

EXAMPLES D–E

A master additive concentrate is prepared by mixing together 20.51 parts of a polyisobutylene ($\overline{M}_n$ ~1600) substituted succinic anhydride-ethylene polyamines bottoms reaction product, 8.94 parts of a zinc salt of mixed methyl amyl-isopropyl dithiophosphate, 5.16 parts calcium overbased (MR ~3.5) sulfurized alkyl phenol, 5.95 parts calcium overbased (MR ~11) alkyl benzene sulfonic acid, 7.38 parts calcium overbased (MR 2.8) alkyl benzene sulfonic acid, 3.34 parts calcium overbased (MR ~1.1) sulfurized alkyl phenol, 0.26 parts of an S-alkyl-2,5-dimercapto-1,3,4-thiadiazole, 4.27 parts of sulfurized butadiene-butyl acrylate Diels-Alder adduct, 0.11 parts of a kerosene solution of a commercial silicone antifoam and sufficient mineral oil to make the total 100 parts by weight.

Lubricating oil compositions are prepared by mixing 11,70 parts of the master additive concentrate, 0.08 parts of a styrene maleate copolymer neutralized with aminopropylmorpholine and the indicated amounts of the product of the Example indicated in the following table into sufficient mineral oil (Exxon SAE 10W-40) to prepare 100 parts of lubricating oil.

TABLE 2

| | Example | |
|---|---|---|
| | D | E |
| Product of Example/(pbw) | 4/8.0 | 6/9.0 |

It is known that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not susceptible of easy description. Nevertheless, all such modifications and reaction products are included within the scope of the present invention; the present invention encompasses the composition prepared by admixing the components described above.

Each of the documents referred to above is incorporated herein by reference. Except in the examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A graft copolymer comprising a hydrocarbon polymer having graft polymerized thereon at least two nitrogen containing units, at least one of the nitrogen containing units being derived from at least one of N-methyl-, N-ethyl-, N,N-dimethyl-, N,N-diethyl-, and N-propyl-(meth)acrylamide, and at least one of the nitrogen containing units being derived from at least one vinylic nitrogen containing heterocyclic compound.

2. The graft copolymer of claim 1 wherein the at least one vinylic nitrogen containing heterocyclic compound comprises an N-vinyl heterocyclic compound.

3. The graft copolymer of claim 2 wherein the N-vinyl heterocyclic compound comprises at least one of N-vinyl imidazole and N-vinyl pyrrolidone.

4. The graft copolymer of claim 1 having from about 0.25 to about 5 moles of (meth)acrylamide units per mole of vinylic nitrogen containing heterocyclic units.

5. The graft copolymer of claim 4 comprising a total of from about 0.2 to about 5 moles nitrogen containing units per 10,000 weight average molecular weight units of hydrocarbon polymer.

6. A process for preparing graft copolymers comprising simultaneously grafting onto a hydrocarbon polymer, under free radical conditions, at least two nitrogen containing monomers, wherein one of the monomers comprises at least one of N-methyl-, N-ethyl-, N,N-dimethyl-, N,N-diethyl-, and N-propyl-(meth)acrylamide and one of the monomers comprises at least one vinylic nitrogen containing heterocyclic compound.

7. The process of claim 6 wherein the vinylic nitrogen containing heterocyclic compound is an N-vinyl heterocyclic compound.

8. The process of claim 7 wherein the N-vinyl heterocyclic compound comprises at least one of N-vinyl imidazole and N-vinyl pyrrolidone.

9. The process of claim 6 wherein the grafting is conducted in the presence of a substantially saturated aliphatic hydrocarbon diluent.

10. The process of claim 9 wherein the diluent is at least one of an oil of lubricating viscosity and a volatile solvent.

11. The process of claim 6 wherein the grafting is conducted in the presence of a free radical initiator selected from the group consisting of diazo compounds, peroxy compounds, nitroxyl radicals and high energy radiation.

12. The process of claim 11 wherein the free radical initiator is selected from the group consisting of benzoyl peroxide, t-butyl peroxybenzoate, t-butyl peroctoate and t-butyl peroxide.

13. The process of claim 6 conducted in an extruder.

14. The process of claim 6 employing from about 0.25 to about 5 moles methacrylamide monomer per mole of vinylic nitrogen-containing heterocyclic monomer.

15. The process of claim employing a total of from about 0.1 to about 5 moles nitrogen containing units per 10,000 weight average molecular weight units of hydrocarbon polymer.

16. A graft copolymer prepared by the process of claim 6.

17. A method for improving the efficiency of the free radical initiated grafting of vinylic nitrogen containing heterocyclic monomers onto hydrocarbon polymers said method comprising simultaneously co-grafting with a mixture of the vinylic nitrogen containing heterocyclic monomer and at least one of N-methyl-, N-ethyl-, N,N-dimethyl-, N,N-diethyl-, and N-propyl-(meth)acrylamide.

18. The method of claim 17 wherein the grafting is conducted in the presence of a substantially saturated hydrocarbon diluent.

19. The method of claim 17 wherein the vinylic nitrogen containing heterocyclic monomer is N-vinyl imidazole.

20. An additive concentrate comprising from about 5% to about 50% by weight of the graft copolymer of claim 1 and from about 50% to about 95% by weight of a normally liquid, substantially inert organic diluent.

21. An additive concentrate comprising from about 5% to about 50% by weight of the graft copolymer of claim 16 and from about 50% to about 95% by weight of a normally liquid, substantially inert organic diluent.

22. The additive concentrate of claim 20 further comprising from about 3% to about 10% by weight of at least one non-graft polymerized hydrocarbon polymer.

23. The additive concentrate of claim 20 comprising from 0.5% to about 5% by weight, based on the total weight of the additive concentrate, of at least one pour point depressant.

24. A lubricating oil composition comprising a major amount of an oil of lubricating viscosity and a minor, viscosity improving and dispersant amount of the graft copolymer of claim 1.

25. A lubricating oil composition comprising a major amount of an oil of lubricating viscosity and a minor, viscosity improving and dispersant amount of the graft copolymer of claim 16.

26. A method for improving the viscometrics and dispersancy characteristics of a lubricating oil composition, said method comprising incorporating therein a minor, viscosity improving and dispersant amount of the graft copolymer of claim 1.

27. A method for improving the viscometrics and dispersancy characteristics of a lubricating oil composition, said method comprising the incorporating there a minor, viscosity improving and dispersant amount of the graft copolymer of claim 16.

* * * * *